United States Patent [19]
Naimark et al.

[11] Patent Number: 5,601,353
[45] Date of Patent: Feb. 11, 1997

[54] PANORAMIC DISPLAY WITH STATIONARY DISPLAY DEVICE AND ROTATING SUPPORT STRUCTURE

[75] Inventors: Michael Naimark, San Francisco; Lee Felsenstein, Palo Alto, both of Calif.

[73] Assignee: Interval Research Corporation, Palo Alto, Calif.

[21] Appl. No.: 575,302

[22] Filed: Dec. 20, 1995

[51] Int. Cl.$^6$ .................................................. G03B 21/00
[52] U.S. Cl. ............................ 353/122; 353/121; 348/36; 348/39; 352/69
[58] Field of Search .......................... 353/94, 122, 121; 359/451, 446; 348/37, 39, 36; 352/69–71

[56] References Cited

U.S. PATENT DOCUMENTS

| | | | |
|---|---|---|---|
| 3,998,532 | 12/1976 | Dykes | 352/69 |
| 4,613,898 | 9/1986 | Baguall-Wild et al. | 348/39 |
| 4,656,506 | 4/1987 | Ritchey | 353/82 |
| 4,827,252 | 5/1989 | Busbridge et al. | 340/729 |
| 5,040,055 | 8/1991 | Smith | 348/39 |
| 5,153,716 | 10/1992 | Smith | 348/39 |
| 5,175,575 | 12/1992 | Gersuk | 353/94 |
| 5,179,399 | 1/1993 | Pringle | 353/94 |
| 5,364,270 | 11/1994 | Aoyama et al. | 434/55 |
| 5,376,980 | 12/1994 | Gersuk et al. | 353/94 |
| 5,448,287 | 9/1995 | Hull | 348/39 |

OTHER PUBLICATIONS

Michael Naimark, "Spatial Correspondence in Motion Picture Display", SPIE vol. 462 Optics in Entertainment II (1984).

Scott Fisher, "Viewpoint dependent imaging: an interactive stereoscopic display", SPIE vol. 367 Processing and Display of Three–Dimensional Data (1982).

Primary Examiner—William Dowling
Attorney, Agent, or Firm—Gray, Cary, Ware & Freidenrich

[57] ABSTRACT

The invention causes a panoramic view to be realistically displayed to a viewing audience. A fixed display device displays a portion of the panoramic view and a rotating support structure supports the viewing audience. The orientation of the portion of the panoramic view shown by the display device changes in coordination with the rotation of the support structure, while the viewing audience changes its viewing direction to continue looking at the display device. The characteristics of the system (in particular, the rotation of the support structure) are controlled so that the viewing audience is not conscious of the movement of the support structure, but thinks, instead, that the display device (and the displayed portion of the panoramic view) is moving about the support structure as the viewing audience changes its viewing direction. The invention can be implemented as a non-interactive system in which the system operates independently of the viewing audience. Alternatively, the invention can be implemented as an interactive system in which the orientation of the displayed portion of the panoramic view and the position of the support structure rotate in response to viewer input. The interactive system can be implemented either as a direct control system or a feedback control system.

18 Claims, 5 Drawing Sheets

PANORAMIC DISPLAY WITH STATIONARY DISPLAY DEVICE AND ROTATING SUPPORT STRUCTURE

BACKGROUND OF THE INVENTION

1. Field of the Invention

This invention relates to the display of panoramic views and, in particular, to the display of panoramic views using a system that includes a stationary display device and a rotating viewer support structure to create the illusion that the display device moves around a viewing audience as the viewing audience changes viewing direction to view different parts of the panoramic view.

2. Related Art

Some video display systems simulate motion of the viewing audience. Generally, such video display systems include a display device and a support structure for supporting the viewing audience (which can be a single viewer or a group of viewers). Often, the display device and support structure interact in some way to enhance the motion simulation.

In one type of motion simulation video display system, the display device (and the viewer's viewing direction) remains fixed while the support structure moves. A vehicle simulator (e.g., flight simulator) and a motion platform (e.g., certain theme park rides) are examples of such systems. The display device can show either linear or rotational motion. The support structure moves so as to transmit the sensation of inertial forces. The movement of the support structure is synchronized with the display device so that the motion sensations experienced by the viewing audience correspond to the video image being shown on the display device. However, in some situations, such as panoramic theaters, it is desirable to simulate motion of the viewing audience without transmitting physical sensations of movement of the support structure. This type of motion simulation video display system does not meet this need.

In another type of motion simulation video display system, the support structure remains fixed while the display device (and a viewer's viewing direction) moves. Virtual reality display devices are examples of such systems (the stationary support structure being, for example, a chair, and the moving display device being, for example, headgear including a display). The display device can show either linear or rotational motion. The motion of the display device causes the viewer to perceive motion of the viewer relative to the displayed environment. However, it is desirable to produce simulated motion of a viewing audience by keeping the display device fixed while the support structure moves, since systems including a moving display device are typically more difficult and expensive to construct.

SUMMARY OF THE INVENTION

The invention causes a panoramic view to be realistically displayed to a viewing audience. A system according to the invention includes a display device for displaying a portion of the panoramic view and a support structure for supporting the viewing audience. The display device remains fixed while the support structure rotates. The orientation of the portion of the panoramic view shown by the display device changes in coordination with the rotation of the support structure (i.e., at the same rotational speed or speeds and about the same rotational axis or axes). The viewing audience changes its viewing direction to continue looking at the display device. The characteristics of the system (in particular, the rotation of the support structure) can be controlled so that the viewing audience is not conscious of the movement of the support structure (i.e., does not receive physical sensations of movement, such as sensations of inertial forces or vestibular sensations), but thinks, instead, that the display device (as well as the portion of the panoramic view shown by the display device) is moving about the support structure as the viewing audience changes its viewing direction. Since the system according to the invention includes a stationary display device and a rotating support structure, the system can be constructed more simply and cheaply than systems that include a rotating display device and a stationary support structure.

The invention can be implemented as a non-interactive system in which the system operates independently of the viewing audience. For the non-interactive system to work as intended, the viewing audience continually changes viewing direction to keep looking at the display device as the support structure rotates.

The invention can also be implemented as an interactive system in which the orientation of the displayed portion of the panoramic view and the position of the support structure rotate in response to viewer input. The interactive system can be implemented either as a direct control system or a feedback control system. In the direct control system, the viewing audience changes viewing direction to continue looking at the display device as the support structure rotates in response to viewer control. In the feedback control system, the orientation of the panoramic view on the display device and the support structure rotate in response to sensed changes in the viewer's viewing direction.

DETAILED DESCRIPTION OF EMBODIMENTS OF THE INVENTION

Figure 1A:
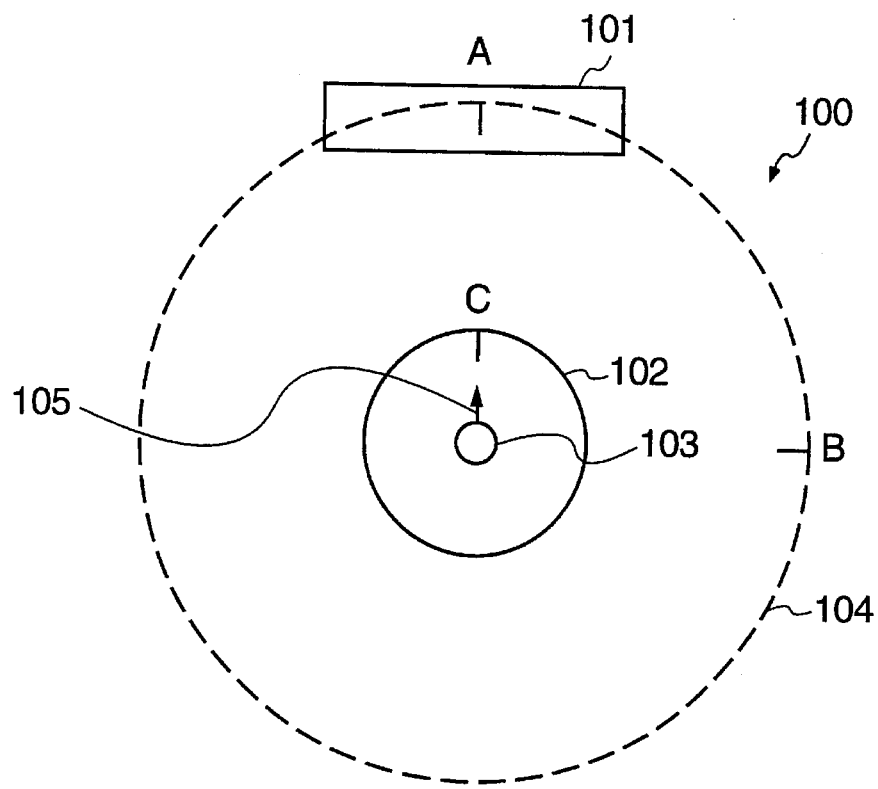
FIGS. 1A and 1B are simplified representations of a system according to the invention, illustrating operation of the system.
Figure 1B:
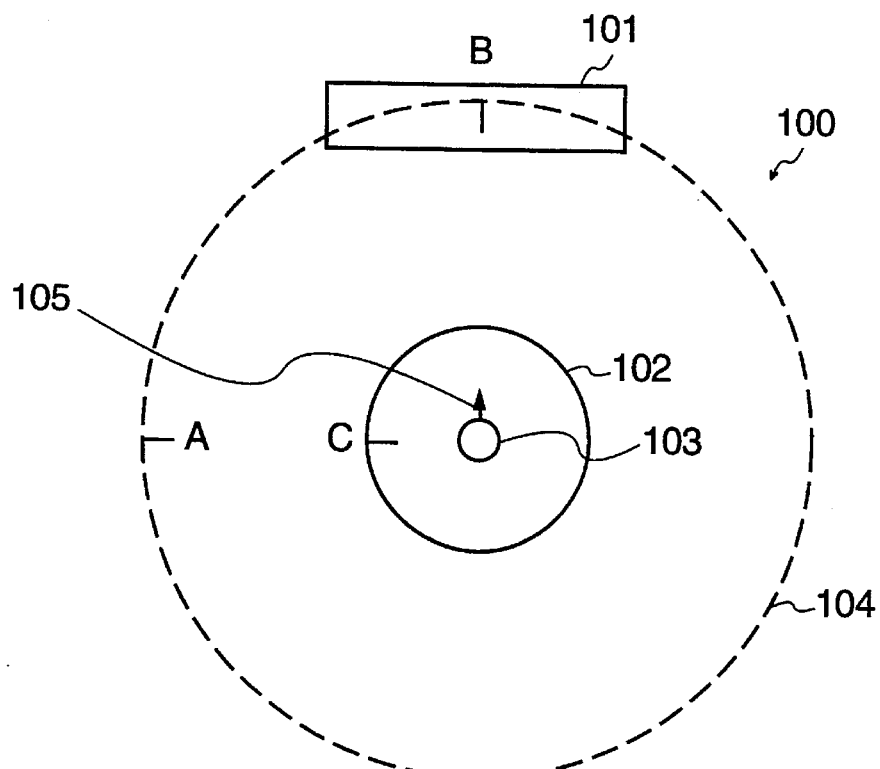

FIGS. 1A and 1B are simplified representations of a system 100, illustrating operation of a system according to the invention. The system 100 includes a display device 101 and a support structure 102. A viewing audience 103 (which can be a single viewer or a group or viewers) is supported by the support structure 102. A portion of a panoramic view 104 (represented by a dashed circle in FIGS. 1A and 1B) is displayed on the display device 101. (As illustrated in FIGS. 1A and 1B, only that portion of the panoramic view 104 that intersects the display device 101 is displayed at any given time.) Herein, "panoramic view" is used to refer to a scene that encompasses all angular viewpoint orientations about a fixed point.

In FIG. 1A, the viewing audience 103 has a viewing direction 105 (illustrated by a directional arrow) such that the viewing audience 103 is looking at the display device 101. The support structure 102 is oriented so that the location C on the support structure 102 is in line with the viewing direction 105. The display device 101 displays a portion of the panoramic view 104 such that a location A within the panoramic view 104 is centered on a display screen of the display device 101.

FIG. 1B illustrates the system 100 after the orientation of the portion of the panoramic view 104 shown on the display device 101 has been changed so that the location B within the panoramic view 104 is centered on the display screen of the display device 101. In FIG. 1B, the orientation of the panoramic view 104 has been rotated approximately 90° from the orientation in FIG. 1A, as shown by the locations A and B. As the orientation of the panoramic view 104 changes (i.e., rotates), the support structure 102 is rotated. In FIG. 1B, the support structure 102 has been rotated approximately 90° (the same amount by which the orientation of the panoramic view 104 has been rotated), as shown by the location C on the support structure 102. In order to continue looking at the display device 101, the viewing audience 103 must change its viewing direction 105 with respect to the support structure 102 (i.e., keep the directional arrow pointing toward the display device 101). (The manner in which the viewing direction of the viewing audience 103 is changed can depend upon the particular embodiment of the support structure 102, as discussed further below). The support structure 102 and the orientation of the panoramic view 104 are rotated at the same speed, so that as the viewing audience 103 changes viewing direction, the viewing audience 103 sees the portion of the panoramic view 104 that would have been seen if the viewing audience 103 was actually in the environment of the panoramic scene and changed their viewing direction.

An important aspect of the invention is that certain characteristics of the system 100 can be controlled so that the perception of inertial forces (i.e., centrifugal and coriolis forces) and vestibular sensations by the viewing audience 103 is inhibited. The viewing audience's movement to change viewing direction (with respect to the support structure 102) to keep looking at the display device 101 also inhibits these perceptions, both because of the movement of the viewing audience 103 and because the viewing audience 103 stays focused on a display screen that stays fixed with respect to the viewing audience 103 in the inertial reference frame. Since the perception of physical sensations associated with rotation of the support structure 102 are inhibited, the viewing audience 103 perceives that the support structure 102 remains stationary and that the display device 101 moves around the viewing audience 103 as the viewing audience 103 changes its viewing direction.

As indicated, certain characteristics of the system 100 can be controlled to inhibit the perception of the physical sensations associated with movement of the support structure 102. For example, the rotational velocity and acceleration of the support structure 102 is an important parameter that should be carefully controlled. The maximum allowable rotational velocity can depend on other physical characteristics of the system 100. However, based upon testing of systems according to the invention and upon prior research into the effects of rotation upon humans, it is believed that maintaining a constant velocity of 1 rpm or less should adequately inhibit the perception of rotation of the support structure 102. Further, the rotational acceleration is ideally maintained at zero; however, since the support structure 102 must be accelerated from rest to a constant operating speed, this acceleration is desirably kept as low as practicable, e.g., on the order of 10 rev/min$^2$.

Additionally, the distance from the viewing audience 103 to the display screen of the display device 101, the distance of the viewing audience 103 from the center of rotation of the support structure 102, and the size (in particular, the width) of the display screen of the display device 101 can all be important, particularly as these quantities relate to each other and to the rotational speed of the support structure 102. Some of these quantities and their interrelationships are discussed, for instance, in a paper entitled "Spatial Correspondence in Motion Picture Display", by Michael Naimark, SPIE Vol. 462 Optics in Entertainment II (1984), the disclosure of which is incorporated by reference herein. For example, for a given display screen size, rate of rotation of the orientation of the panoramic view, and focal length of the lens used to obtain the panoramic view, there exists an optimum rate of rotation of the viewing audience, determined as discussed in the Naimark paper.

To facilitate explanation of the invention, the illustration and discussion of the invention above with respect to FIGS. 1A and 1B is made for rotation of the support structure (and panoramic view) about a single axis. It is to be understood that rotation of the support structure and panoramic view can occur about any axis and, moreover, such rotation can occur about more than one axis simultaneously (e.g., two axes that are perpendicular to each other). The principles of the invention discussed above can apply to each axis about which rotation occurs.

Since the system 100 includes a stationary display device 101 and a rotating support structure 102, the system 100 can be constructed more simply and cheaply than systems that include a rotating display device and a stationary support structure. This is particularly so for the wide angle display screens that are necessary to create the illusion of immersion in the environment of a panoramic view, due to the difficulty of coupling large rotating display screens accurately with projectors that can be used to produce the display of the panoramic view and the difficulty of conveying electrical power and signals for generating the display across a rotational bearing or bearings that would be necessary to allow the display screen to rotate.

Figure 2A:
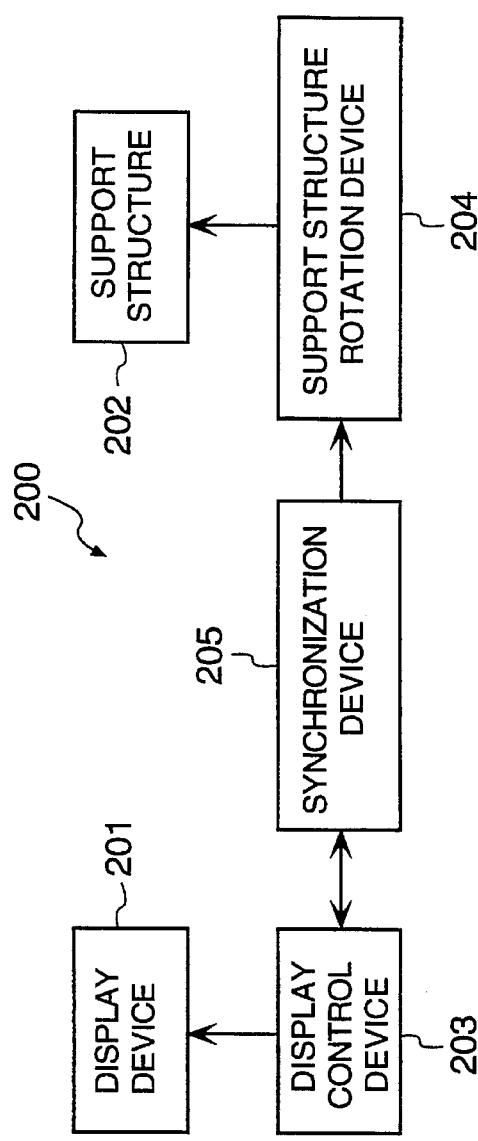
FIG. 2A is a block diagram of a "non-interactive" system according to the invention.

FIG. 2A is a block diagram of a system 200 according to one embodiment of the invention. The system 200 includes a display device 201, a support structure 202, a display control device 203, a support structure rotation device 204 and a synchronization device 205. The system 200 is a "non-interactive" system that operates independently of the viewing audience. The display device 201 displays a portion of a panoramic view, the orientation of which is rotated at a specified speed (e.g., 1 rpm). Rotation of the panoramic view is synchronized with rotation of the support structure 202. In order to appreciate the effects of the system 200, the viewing audience must rotate their viewing direction with respect to the support structure 202 so as to compensate for the rotational motion of the support structure 202.

The display device 201 can be any conventional display device, such as a conventional motion picture projector and screen, a computer including a display monitor, or a television.

The display control device 203 includes a display controller and a display generator and can be implemented by any conventional such devices. The particular display controller and display generator used can depend upon the particular type of display device 201 that is used. For example, if the display device 201 is a computer display monitor, the display generator can be a VGA board. The display control device 203 can be implemented for example, as an appropriately programmed digital computer that causes the panoramic view on the display device 201 to be updated (from existing video image data—stored on, for example, a hard disk of the computer—representing the panoramic view at different orientations) at a rate that results in rotation of the orientation of the panoramic view at the specified speed.

The support structure rotation device 204 can be any conventional device or devices, such as a motor or motors, that can drive the support structure 202 to rotate. As suggested above, the support structure rotation device 204 can be constructed to enable rotation of the support structure 202 about more than one axis at a time.

The synchronization device 205 synchronizes the display of the panoramic view on the display device 201 with the rotation of the support structure 202. Since both of these rotations occur at the same speed (e.g., 1 rpm) about the same axis or axes, the synchronization device 205 can be, for example, a motor controller or controllers that control the motor or motors (support structure rotation device 204) to rotate the support structure 202 at the specified rotational speed or speeds.

The support structure 202 can be embodied in any of a variety of ways. For example, the support structure 202 can be a chair, a platform, or a suspended support harness. It is anticipated that, for embodiments of the invention in which the support structure 202 rotates simultaneously about more than one axis, the support structure 202 should be embodied by a structure that securely holds the viewing audience in place (e.g., a chair or harness).

Figure 2B:
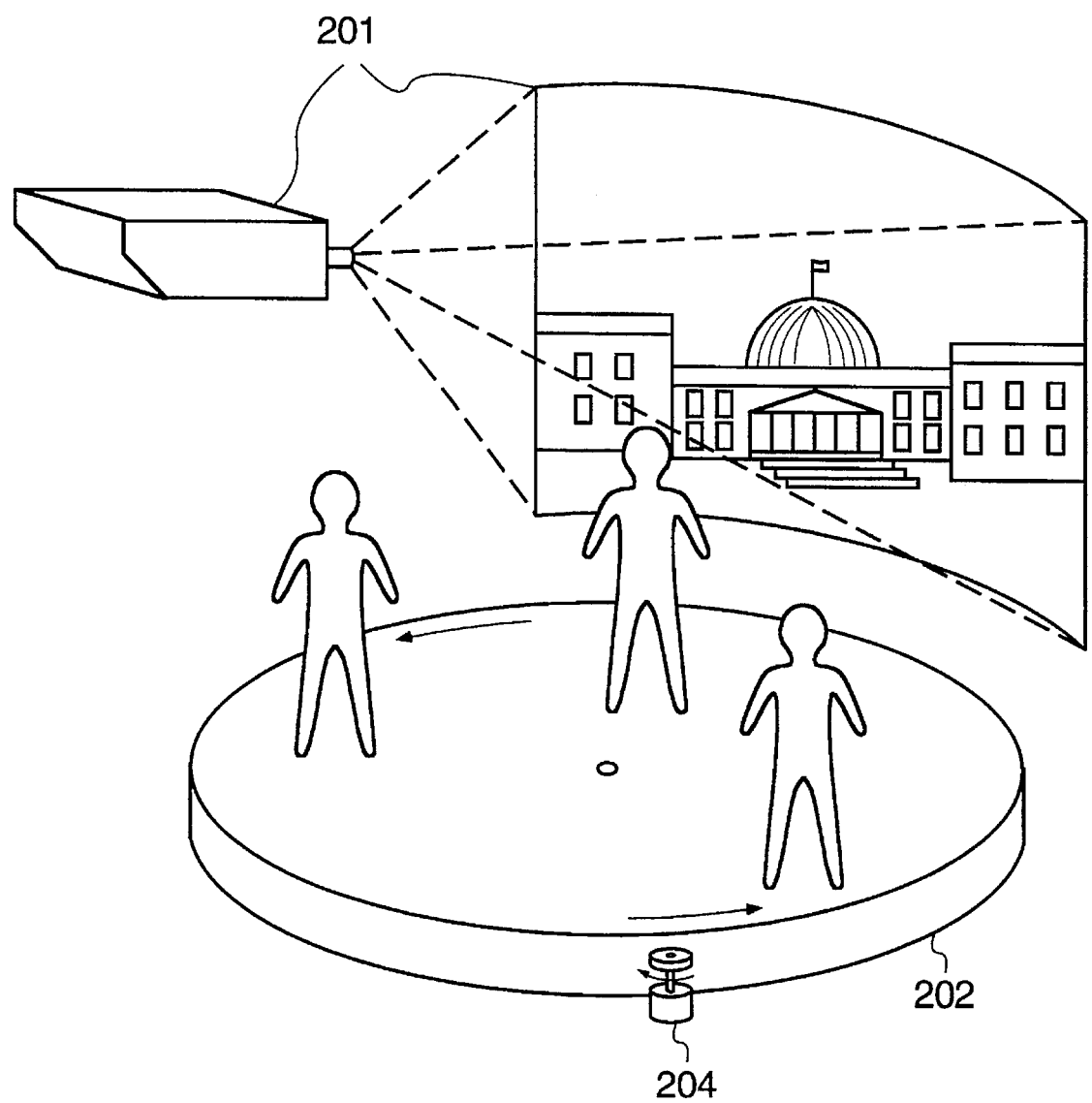
FIG. 2B is a perspective view of a panoramic theater according to the invention.

In a particular embodiment of the system 200, the support structure 202 is a rotating platform. The rotating platform can be constructed in any of a number of ways that are known to those skilled in the art. The rotating platform can be operably coupled to the support structure rotation device 204 (e.g., motor) using known techniques and apparatus. The rotating platform should be made large enough to support an anticipated number of viewers. An embodiment of the invention in which the support structure 202 is a rotating platform can be used, for example, to implement a panoramic theater in which an audience gradually turns on the rotating platform to watch the sweeping of a panoramic view shown on the display device 201. When the invention is used to implement a large-scale panoramic display such as a panoramic theater, the display screen of the display device 101 can be curved (e.g., the display screen can have a circular curvature) to enhance the panoramic effect. FIG. 2B is a perspective view of a panoramic theater according to the invention. (Components of the panoramic theater of FIG. 2B that are the same as components of the system 200 of FIG. 2A are designated by the same numerals.)

In a particular embodiment of the invention in which the support structure 202 is a circular rotating platform, the diameter of the rotating platform is 16 feet. The display screen of the display device 201 preferably has a circular curvature. The distance from the center of the rotating platform to the edges of the display screen of the display device 201 is also 16 feet. (It is believed that the distance from the center of the rotating platform to the display device 201 should be at least eight feet from the closest point a viewer can come to the display screen for stereoscopic applications, and sixteen feet for monoscopic applications.) The width of the display screen (measured along the chord extending between ends of the display screen) of the display device 201 is, likewise, 16 feet, so that the displayed panoramic view subtends an angle of 60°. The platform is rotated at a constant rotational velocity of 1 rpm. From rest, the platform is accelerated at constant acceleration to the constant operating velocity of 1 rpm over a period of 5 seconds.

Figure 3A:
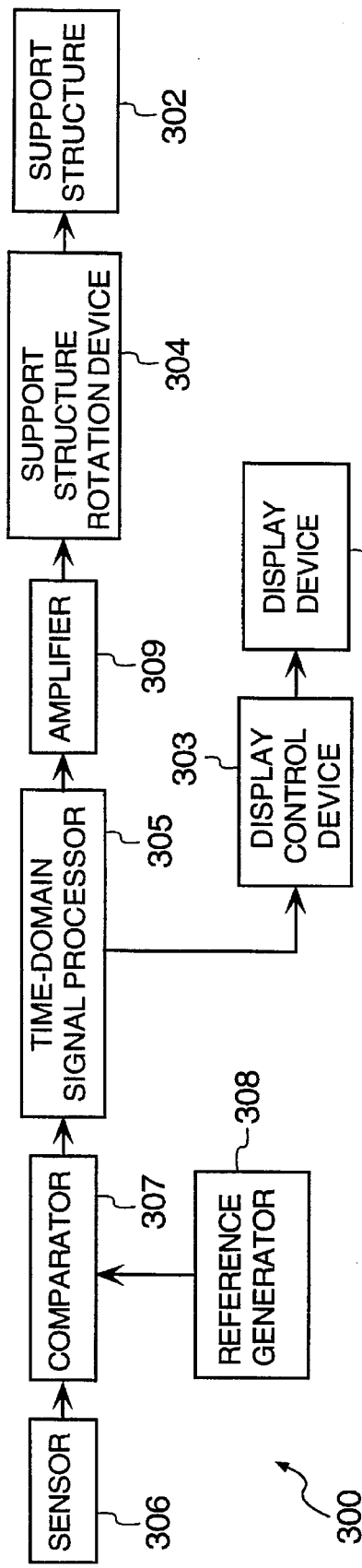
FIG. 3A is a block diagram of an "interactive" system according to the invention.

FIG. 3A is a block diagram of a system 300 according to another embodiment of the invention. The system 300 is an "interactive" system in which the orientation of the panoramic view on the display device 301 changes (i.e., rotates) and the support structure 302 rotates in response to a viewer's changes in viewing direction. Aside from changes in viewing direction, the viewer generally remains stationary on the support structure 302. The system 300 is a feedback control system in which the viewer indirectly controls operation of the system 300 by changing his viewing direction, which changes are sensed by the system 300 and used to control the display device 301 and the support structure 302.

Similarly to the non-interactive system 200 (FIG. 2A), the system 300 includes a display device 301, a support structure 302, a display control device 303, and a support structure rotation device 304. The display device 301 and display control device 303 can each be implemented as described above for the corresponding parts of the system 200 (i.e., display device 201 and display control device 203).

The support structure 302 is preferably a support structure that is adapted to securely hold a single viewer in place during rotation of the support structure 302. The support structure 302 could be, for example, a chair or suspended support harness that is adapted to rotate. The rotating chair or harness can be constructed in any of a number of ways that are known to those skilled in the art. The support structure rotation device 304 can be, for example, a conventional servo motor that is operably connected, using apparatus and techniques well-known to those skilled in the art, to the support structure 302 so that the support structure rotation device 304 can rotate the support structure 302. The support structure 302 and support structure rotation device 304 can be adapted to rotate simultaneously about more than one axis, as described above.

The sensor 306 senses changes in the viewer's viewing direction. Any sensor that can accurately sense changes in viewing direction (i.e., rotational movement of the viewer's gaze about an axis that is substantially centered along and parallel to the length of a viewer's body) can be used. There are a number of such sensors that can be mounted on headgear that is worn on the viewer's head. For example, a Polhemus sensor, a well-known magnetic sensor used in many so-called virtual reality applications that sense all three components of rotational motion and all three components of translational motion, can be used. Or, a gyroscopic sensor (again, mounted on the head of the viewer and capable of sensing all three components of rotational motion) including a piezoelectric motion transducer could be used. Or, an optical sensor (e.g., infrared sensor) could be used to sense the relative positions of the pupils and, possibly, the sclera of the eyes to discern the angular orientation of the viewer's head. For some applications, sensors that sense scapular (shoulder) pressure and motion could be used. However, scapular motion sensors are limited to applications in which the viewer must move his shoulders with movement of his head when changing viewing direction.

The sensor 306 transmits an electrical signal having a magnitude that is proportional to the viewing direction of the viewer's head. A reference generator 308 transmits a reference electrical signal having a magnitude representing a reference position (e.g., looking straight ahead at the display device 301) of the viewer's head. These electrical signals are input to a comparator 307 which produces an output signal (error signal) that has a magnitude that represents the difference between the magnitudes of the input signals. This error signal indicates the amount by which the viewer has turned his head so that the viewer is no longer looking at the display device 301.

The error signal from the comparator 307 is input to a time-domain signal processor 305. The time-domain signal processor 305 can be implemented using techniques and apparatus known to those skilled in the art of servo-operated mechanical systems to produce two control signals having the following desired characteristics. The time-domain signal processor 305 can be implemented to produce analog or digital control signals as desired.

The time-domain signal processor 305 produces a first control signal that is used to control rotation (velocity and acceleration) of the support structure 302. The first control signal should cause the support structure 302 to be repositioned rapidly enough to adequately track changes in the viewer's viewing direction. However, the first control signal should also be smooth (i.e., without discontinuities) so that, when a change in the position of the support structure 302 is required, the change can be accomplished without jerkiness, so that the kinaesthetic sensation of movement felt by the viewer is minimized. The first control signal is also produced so as to minimize acceleration of the support structure 302 consistent with the goal of repositioning the support structure 302 rapidly, again to minimize the kinaesthetic sensation of movement. Additionally, the first control signal should respond only to changes in viewing direction above a minimum threshold.

The time-domain signal processor 305 produces a second control signal that is used to control the content of the display device 301. The second control signal causes the display control device 303 to update the display on the display device 301 so as to track the change in the viewer's viewing direction so that the viewer sees the portion of the panoramic view that would be seen if the viewer was actually in the environment of the panoramic scene. Using the sensed position of the viewer's viewing direction, this can easily be done using video image data that correlates portions of the panoramic view to viewing directions. Alternatively, a conventional rotational position sensor can be mounted on the support structure 302, and the sensed position of the support structure 302 used to generate the second control signal.

Additionally, the time-domain signal processor 305 can produce the first and second time derivatives of the change in the viewer's viewing direction. These derivatives can be used by the display control device 303, as known by those skilled in the art, to control image characteristics such as blur and foreshortening.

The first control signal output from the time-domain signal processor 305 can be amplified by a conventional amplifier 309 which produces a support structure control signal that is used to drive the support structure rotation device 304. The second control signal output from the time-domain signal processor 305 is input to the display control device 303 which produces a display control signal that is used to control the display device 301.

In operation of the system 300, as the viewer turns his head (i.e., changes viewing direction), the system 300 senses the head movement and both rotates the support structure 302 and updates the panoramic view so that the viewer continues to see the display device 301 that now shows a portion of the panoramic view that has an orientation that is rotated from the orientation of the originally displayed portion of the panoramic view by an amount equal to the amount that the viewer rotated his head. Thus, the viewer perceives that, as he turns his head, a window on to the panoramic view (the display device 301) has rotated about him to show another portion of the panoramic view. For example, if the viewer turns his head 45° to the right, the support structure 302 rotates 45° to the left so that the viewer continues to look at the display device 301. Simultaneously, the orientation of the panoramic view shown on the display device 301 rotates 45° to the right so that the viewer sees the view that would be seen if the full panoramic scene was visible around the viewer and the viewer had rotated his head 45° from the initial position.

As in the non-interactive system 200 (FIG. 2A), the support structure 302 of the interactive system 300 can be rotated so as to minimize the physical sensation of movement of the support structure 302 consistent with the goal of rapidly turning the viewer so that the viewer continues to look at the display device 301. Such physical sensation can be minimized in the manner and for the reasons described above. However, since the viewer can change his viewing direction relatively rapidly, in practice, there can be an unavoidable trade-off between these two goals. It should be noted, though, that for embodiments of the invention in which the viewer controls the rotation of the support structure and panoramic view, rotational velocities and accelerations of greater magnitudes can be tolerated by the viewer without perception of motion sensations. Thus, for example, the above-discussed limitation of 1 rpm for rotational velocity may not be applicable in these embodiments.

Figure 3B:
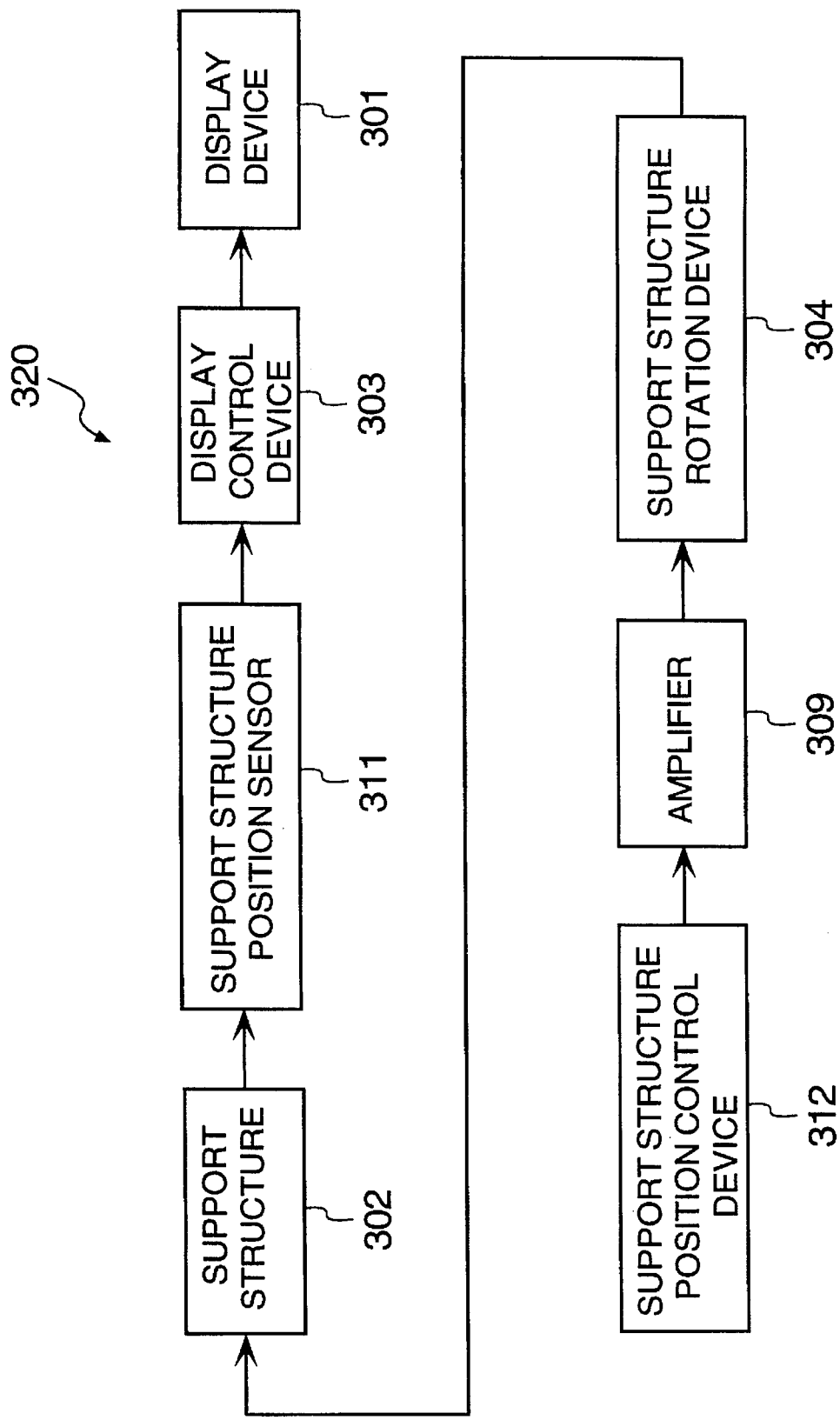
FIG. 3B is a block diagram of another "interactive" system according to the invention.

FIG. 3B is a block diagram of an "interactive" system 320 according to yet another embodiment of the invention. The system 320 includes a display device 301, a support structure 302, a display control device 303, a support structure rotation device 304 and an amplifier 309 that are the same as the like-numbered components of the system 300 (FIG. 3A).

In contrast to the system 300, the system 320 is a direct control system in which the viewer directly controls operation of the system 320 through use of a support structure position control device 312 to operate the support structure 302. In response to input from the viewer, the support structure control device 312 produces a signal that is amplified by the amplifier 309, which amplified signal is used to drive the support structure rotating device 304 as described above with respect to FIG. 3A. The support structure control device 312 can be any conventional control device such as, for example, a push button, lever switch or potentiometer.

A support structure position sensor 311 is attached to the support structure 302 and generates a signal that corresponds to the rotational position of the support structure 302. The support structure position sensor 311 can be any conventional rotational position sensor such as a mechanical potentiometer or an optical shaft encoder. The generated signal from the support structure position sensor 311 is similar to the second control signal produced by the time-domain signal processor 305 of the system 300 (FIG. 3A) and is input to the display generator 303 as previously described, so that the viewer sees the portion of the panoramic display which would be seen if the viewer was actually in the environment of the panoramic scene and looking with the orientation as sensed by the support structure position sensor 311. Though not shown in FIG. 3B, the sensed position can also be fed back to a comparator that is part of the support structure position control device 312 and compared to a reference signal that represents the commanded position of the support structure 302, thus implementing a feedback control system for controlling the position of the support structure 302. The viewer senses that, rather than causing the motion of the support structure 302, he is causing an opposite movement of a viewing window represented by the display device 301. The viewer turns his head so as to maintain his direction of gaze at the display device 301, and by so doing maintains his head in a stable position with respect to the inertial reference frame. This prevents unwanted inertial sensations and gives the viewer the sense that he is in control of the motion of the viewing window.

Figure 3C:
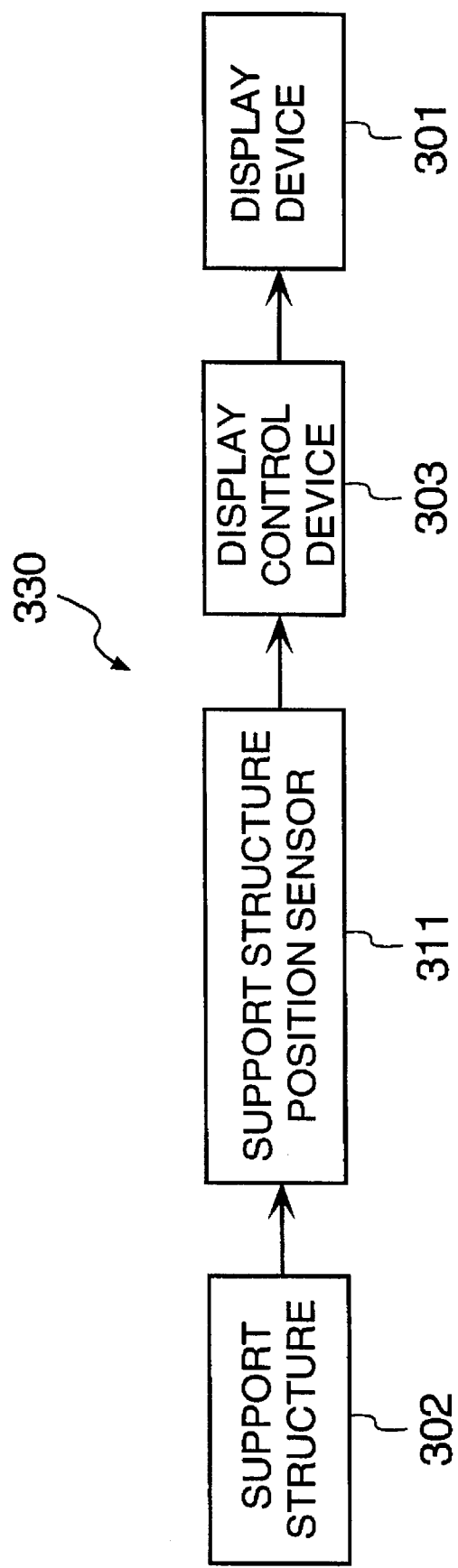
FIG. 3C is a block diagram of yet another "interactive" system according to the invention.

FIG. 3C is a block diagram of an "interactive" system 330 according to still another embodiment of the invention. The system 330 includes a display device 301, a support structure 302, a display control device 303 and a support structure position sensor 311 that are the same as the like-numbered components of the system 320 (FIG. 3B). Like the system 320, the system 330 is a direct control system. However, the system 330 differs from the system 320 in the manner in which the viewer controls the system. In the system 330 the viewer supplies the motive force (rather than using a support structure position control device 312 as in the system 320) to cause the support structure 302 to rotate. For example, if the support structure 302 is a chair, the viewer can push with his legs to cause the chair to rotate. The viewer senses that, by using his body, he can cause the viewing window represented by the display device 301 to rotate about him.

Various embodiments of the invention have been described. The descriptions are intended to be illustrative, not limitative. Thus, it will be apparent to one skilled in the art that certain modifications may be made to the invention as described above without departing from the scope of the claims set out below.

We claim:

1. A system for displaying a panoramic view to a viewing audience, comprising:

means for displaying a portion of the panoramic view that corresponds to a particular rotational orientation of the panoramic view, the means for displaying being fixed in position;

means for controlling the means for displaying so that various portions of the panoramic view can be displayed;

means for supporting the viewing audience so that the viewing audience can look at the means for displaying;

means for rotating the means for supporting so that the viewing audience must change viewing direction to continue looking at the means for displaying as the means for supporting rotates; and means for synchronizing operation of the means for rotating and the means for controlling the means for displaying so that the means for supporting is rotated in a synchronous manner with the rotation of the orientation of the portion of the panoramic view displayed by the display device.

2. A system as in claim 1, wherein the means for rotating rotates the means for supporting with a rotational velocity having a magnitude such that, if the viewing audience continually changes its viewing direction so as to continually look at the means for displaying while the means for supporting is rotating, the viewing audience does not perceive the physical sensation of rotation of the means for supporting.

3. A system as in claim 2, wherein the rotational velocity is 1 rpm or less.

4. A system as in claim 1, wherein the means for supporting further comprises a platform for supporting one or more viewers.

5. A system as in claim 1, wherein the means for supporting further comprises a chair for supporting a viewer.

6. A system as in claim 1, wherein the means for supporting further comprises a support harness for supporting a viewer.

7. A system for displaying a panoramic view to a viewer, comprising:

means for displaying a portion of the panoramic view that corresponds to a particular rotational orientation of the panoramic view, the means for displaying being fixed in position;

means for controlling the means for displaying so that various portions of the panoramic view can be displayed;

means for supporting the viewer so that the viewer can look at the means for displaying;

means for rotating the means for supporting so that the viewer must change viewing direction to continue looking at the means for displaying as the means for supporting rotates;

means for sensing a change in the viewing direction of the viewer; and means for controlling the means for rotating and the means for controlling the means for displaying in response to the sensed change in viewing direction of the viewer.

8. A system as in claim 7, wherein the means for sensing further comprises a sensor mounted on headgear worn by the viewer.

9. A system as in claim 7, wherein the means for sensing further comprises an optical sensor that senses the positions of the pupils of the eyes of the viewer.

10. A system as in claim 7, wherein the means for sensing further comprises a sensor that senses scapular pressure and motion.

11. A system for displaying a panoramic view to a viewing audience, comprising:

means for displaying a portion of the panoramic view that corresponds to a particular rotational orientation of the panoramic view, the means for displaying being fixed in position;

means for controlling the means for displaying so that various portions of the panoramic view can be displayed;

means for supporting the viewing audience so that the viewing audience can look at the means for displaying;

means for rotating the means for supporting so that the viewing audience must change viewing direction to continue looking at the means for displaying as the means for supporting rotates;

means for enabling a viewer to directly control the means for rotating so that the viewer can rotate the means for rotating to a desired rotational position; and means for sensing the rotational position of the means for supporting, the sensed rotational position being used to control the means for controlling the means for displaying to cause a portion of the panoramic view to be displayed that corresponds to the sensed rotational position.

12. A system for displaying a panoramic view to a viewing audience, comprising:

means for displaying a portion of the panoramic view that corresponds to a particular rotational orientation of the panoramic view, the means for displaying being fixed in position;

means for controlling the means for displaying so that various portions of the panoramic view can be displayed;

means for supporting the viewing audience so that the viewing audience can look at the means for displaying, the means for supporting being rotatably mounted such that when the means for supporting is rotated the viewing audience must change viewing direction to continue looking at the means for displaying as the means for supporting rotates; and means for sensing the rotational position of the means for supporting, the sensed rotational position being used to control the means for controlling the means for displaying to cause a portion of the panoramic view to be displayed that corresponds to the sensed rotational position.

13. A method for displaying a panoramic view to a viewing audience, comprising the steps of:

displaying on a fixed display device a portion of the panoramic view that corresponds to a particular rotational orientation of the panoramic view;

controlling the display device so that various portions of the panoramic view can be displayed;

supporting the viewing audience on a support structure so that the viewing audience can look at the display device;

rotating the support structure so that the viewing audience must change viewing direction to continue looking at the display device as the support structure rotates; and synchronizing the steps of rotating and controlling so that the support structure is rotated in a synchronous manner with the rotation of the orientation of the portion of the panoramic view displayed by the display device.

14. A method as in claim 13, wherein the step of rotating further comprises rotating the support structure with a rotational velocity having a magnitude such that, if the viewing audience continually changes its viewing direction so as to continually look at the display device while the support structure is rotating, the viewing audience does not perceive the physical sensation of rotation of the support structure.

15. A method as in claim 14, wherein the rotational velocity is 1 rpm or less.

16. A method for displaying a panoramic view to a viewer, comprising the steps of:

displaying on a fixed display device a portion of the panoramic view that corresponds to a particular rotational orientation of the panoramic view;

controlling the display device so that various portions of the panoramic view can be displayed;

supporting the viewer so that the viewer can look at the display device;

rotating the support structure so that the viewer must change viewing direction to continue looking at the display device as the support structure rotates;

sensing a change in the viewing direction of the viewer; and controlling the step of rotating and the step of controlling the display device in response to the sensed change in viewing direction of the viewer.

17. A method for displaying a panoramic view to a viewing audience, comprising the steps of:

displaying on a fixed display device a portion of the panoramic view that corresponds to a particular rotational orientation of the panoramic view;

controlling the display device so that various portions of the panoramic view can be displayed;

supporting the viewing audience so that the viewing audience can look at the display device;

rotating the support structure so that the viewing audience must change viewing direction to continue looking at the display device as the support structure rotates;

enabling a viewer to directly control the step of rotating so that the viewer can rotate the means for rotating to a desired rotational position; and sensing the rotational position of the support structure, the sensed rotational position being used to control the step of controlling the display device to cause a portion of the panoramic view to be displayed that corresponds to the sensed rotational position.

18. A method for displaying a panoramic view to a viewing audience, comprising the steps of:

displaying on a fixed display device a portion of the panoramic view that corresponds to a particular rotational orientation of the panoramic view;

controlling the display device so that various portions of the panoramic view can be displayed;

supporting the viewing audience so that the viewing audience can look at the display device, the support structure being rotatably mounted such that when the support structure is rotated the viewing audience must change viewing direction to continue looking at the display device as the support structure rotates; and sensing the rotational position of the support structure, the sensed rotational position being used to control the step of controlling the display device to cause a portion of the panoramic view to be displayed that corresponds to the sensed rotational position.

* * * * *